Patented Dec. 31, 1940

2,226,576

UNITED STATES PATENT OFFICE 2,226,576

METHOD OF MAKING SODIUM HYPO-SULPHITE

Ralph S. Park, Queens Village, N. Y., and George S. Simpson, Plainfield, N. J., assignors to General Chemical Company, New York, N. Y., a corporation of New York No Drawing. Application April 6, 1938,
Serial No. 200,420

9 Claims. (Cl. 23—116)

This invention relates to the manufacture of sodium hyposulphite and is particularly directed to a process whereby a higher yield and higher purity of product are obtainable than by the procedures previously employed.

It has in the past been proposed to prepare sodium hyposulphite in either anhydrous or hydrated form by treating zinc dust with aqueous sulfur dioxide, adding sodium hydroxide to the reaction product, and subsequently crystallizing the desired product by salting out with sodium chloride or by evaporating the solution to dryness. The prior procedures, however, have resulted in exceedingly low yield or purity of the products. For instance, the highest yields of sodium hyposulphite we have obtained by the salting out method have been in the neighborhood of 50% of theoretical, based on the weight of metallic zinc used; the sodium hyposulphite product thus prepared had a purity, i. e. sodium hyposulphite content, in the neighborhood of 96%. The highest yields of sodium hyposulphite we have obtained by the vacuum evaporation method have been in the neighborhood of 70% to 75% of theoretical, on the basis of the weight of metallic zinc used; this sodium hyposulphite product had a purity of only about 88%.

In accordance with the present invention we have found that by concentration of a sodium hyposulphite solution by vacuum evaporation thereof to a sodium hyposulphite content between 30% and 55% by weight of the total mass and subsequent salting out of the sodium hyposulphite from this mixture, a product of exceedingly high purity may be obtained with much higher yields than formerly secured for products of corresponding purity. By this process yields in the neighborhood of 70% of theoretical are readily obtainable and the purity of this sodium hyposulphite product is in the neighborhood of 95% to 96%. Since in operating by prior methods, an increase in purity from 88% to 96% required a decrease in yield from 75% to 50% (a 25% lower yield in exchange for an 8% increase of purity), is might be expected that in decreasing the yield 5% an increase of purity only one-fifth of 8% or 1.6% would be obtained. Thus, where a purity of 88% plus 1.6% or 89.6% was to be expected, a purity of 95% to 96% was actually obtained. On the basis of linear proportions, it would be expected that a yield of no more than 53% could be obtained while maintaining a purity of 95%. Thus the expectable increase in yield resulting from a sacrifice of 1% purity was 3/50 or 6%.

In accordance with the process of the present invention, however, yields of 70%, corresponding to an increase of 20/50 or 40%, are obtainable without a sacrifice of even 1% of purity.

In the manufacture of the sodium hyposulphite solution, it is preferred to introduce sulfur dioxide into a slurry of zinc dust of sufficient concentration so that upon subsequent treatment with alkali a substantially saturated solution of sodium hyposulphite will be produced. For conversion of the zinc hyposulphite to sodium hyposulphite we propose to employ sodium carbonate, which precipitates the zinc as zinc carbonate. This precipitate may be filtered off and the remaining solution then may be treated with lime to remove excess carbonate as calcium carbonate. The lime serves the purpose of producing sodium hydroxide from sodium bicarbonate, which we have found to be present as a result of the treatment of the zinc hyposulphite with sodium carbonate. The sodium hydroxide thus formed serves to stabilize the final product. If an excess of lime is added, as is frequently convenient, a small quantity of sodium carbonate may subsequently be employed to remove dissolved calcium.

A liquor prepared in the above manner will contain around 180 to 200 grams $Na_2S_2O_4$ per liter and around 7 grams NaOH per liter. It will also contain some sodium sulfate, sodium thiosulfate, and sodium sulfite. The proportions of these impurities present will depend upon the way in which the previous steps of the process have been conducted and may be minimized by avoiding elevated temperatures and by avoiding introduction of oxidizing materials.

In accordance with our invention such a solution is evaporated under vacuum to a concentration between 30% and 55% $Na_2S_2O_4$. Within these limits the preferred sodium hyposulphite concentration will depend upon the limits of purity permissible in the product and the content of impurities present in the mixture. Thus, for any particular solution the product purity will be highest for a 30% mixture and lowest for a 55% solution, and the yields will be highest for the 55% mixture and lowest for the 30% mixture. The vacuum evaporation is carefully controlled so that the temperature of the liquid at no time substantially exceeds 31° C. as we have found that at higher temperatures rapid decomposition of the sodium hyposuphite in solution takes place.

After the desired degree of concentration is obtained, the product, in the form of a slurry containing crystalline sodium hyposulphite dihydrate as the solid phase, is heated to a temperature between 55° and 65° C. This dehydrates the dihydrate and forms a slurry of the anhydrous hyposulphite. Sufficient salt is added to the slurry to substantially saturate the solution. It is preferred to add the salt directly to the slurry since if the solid present is first separated from solution by any of the ordinary separation methods without oxidation-preventive measures, the resultant solution, by oxidation and decomposition, will have become unfit to yield the high proportions of hyposulphite otherwise obtainable. The salt used to salt out the hyposulphite may be any of those commonly employed, such as sodium chloride, soda ash, sodium acetate, etc. After the addition of the salt the mixture is agitated for a short time at a temperature within the range specified, to permit the sodium hyposulphite to crystallize out.

The product is treated to separate its solid content from liquid while its high temperature is maintained. The separation may be effected centrifugally to advantage since such separation does not require maintenance at elevated temperatures for any great period of time and as a consequence the purity of the product will not be reduced because of any appreciable decomposition. By the separation of sodium hyposulphite at a temperature of 55° to 65° C. the anhydrous sodium hyposulphite is directly formed instead of the hydrate salt formed by crystallization at ordinary room temperature. As a consequence of this feature the solid constitutes a smaller proportion of the total solution treated and the ratio of impurities to $Na_2S_2O_4$ is substantially reduced.

The following example illustrates the method of conducting our process:

110 pounds of zinc dust are dispersed in about 820 pounds of water in a closed tank. Nitrogen is introduced into the gas space over the water (it may be bubbled through the water to remove the dissolved oxygen also) and, after all the air in the tank has been displaced in this manner, $SO_2$ gas is introduced into the bottom of the tank. During the introduction of $SO_2$ the zinc slurry is continually agitated and by suitable cooling the solution is maintained at a temperature around 38° C. or below.

When the color of the batch has changed from the bluish-gray tint of metallic zinc to a cream, the admission of $SO_2$ is stopped; usually 207 pounds of the $SO_2$ will have been added at this point. To the resultant mixture 250 pounds of soda ash, $Na_2CO_3$, are added. The addition causes considerable foaming and accordingly should be conducted gradually to avoid loss of solution. The mixture is stirred for 15 minutes and then filtered. Since the filter cake itself serves as a filter medium, it may be desirable to return solution from the filter to the reaction tank until a sufficient quantity of cake has been built up in the filter to provide satisfactory elimination of solid matter from solution.

The clear liquor from the filter is stored in such a manner that air is excluded. For this purpose the solution may be run under a layer of oil which serves to prevent its contact with air or the tank may be filled with nitrogen as in the case of the reaction tank. To remove adhering solution, the filter cake may be washed with water. First washings may be added to the filtrate and later washings may be employed as the suspension medium for zinc in a succeeding run, thus conserving the hyposulfite content of the precipitate. To the clear filtrate 25 pounds of calcium hydroxide are gradually added with stirring; the mixture is agitated for one-half hour and then filtered and the filtrate collected, again with the exclusion of air.

To this filtrate ½ pound of sodium carbonate, $Na_2CO_3$, is added; the mixture is allowed to stand for about twelve hours to permit calcium carbonate resulting from the presence of any excess lime to settle out.

The clear liquor may then be passed to an evaporator, which may be of any conventional type for effecting evaporation with a minimum of decomposition, i. e. the evaporator should provide for rapid evaporation without excessive temperature. Inert gas or vacuum distillation and relatively high ratio of heating surface to liquid volume give a short heating period and are advantageous, as is continuous operation. However, a jacketed, cone-bottom kettle of 25–20 chromium-nickel steel is satisfactory. In order to avoid substantial contact of the solution with air in the evaporator, the evaporator may be first evacuated, say to an absolute pressure of 15 mm. of mercury, and the solution subsequently introduced thereinto. Otherwise the air may first be displaced with inert gas. The jacket of the kettle should contain water or other heating fluid maintained at such a temperature that the temperature of the solution in the evaporator does not rise above 31° C. during the evaporation. Preferably the pressure should be maintained below 35 mm. of mercury throughout this process. The evaporation is continued until the $Na_2S_2O_4$ content of the batch is approximately 50%, of which about 30% (about 15% of the batch) is present as $Na_2S_2O_4.2H_2O$ in solid phase. The amount of water removed by evaporation will vary to some extent, of course, depending upon the original content of hyposulfite and upon the amount of water added, for instance as a result of washing filter cakes. When the requisite concentration is acquired, nitrogen is admitted to the evaporator to increase the pressure to atmospheric.

The batch amounting to about 466 pounds is heated to 60° C. to dehydrate the hydrated hyposulfite and form a slurry still containing about 50% $Na_2S_2O_4$, of which about 15% is present as the solid anhydrous salt. 72 pounds of sodium chloride are added over a period of 10 to 15 minutes. For such a batch it is desirable that the sodium chloride be added in a period of not less than 10 minutes, for instance 15±5 minutes, in order to produce a crystalline product of satisfactory granule size. The slurry is stirred for 15 minutes to complete the crystallization and is then drawn off to a centrifuge for separating mother liquid from the crystals.

The crystalline product is washed first with alcohol and then with toluene. Thus freed of water, the product may be air-dried at a temperature of 50° to 60° C. after which it is ready for screening and packaging.

Mother liquor remaining from the crystallization of the anhydrous sodium hyposulfite may be chilled to below 52° C., preferably below 20° C., to effect crystallization of the remaining hyposulfite in the form of the dihydrate, which then may be separated from solution and added to a subsequent evaporator charge so that this hyposulfite will not be wasted. But, unless especial precautions are taken to avoid air-oxidation of the solution in and after the centrifuging operation, there usually will not be sufficient hyposulfite present in the liquor to justify further recovery treatment.

We claim:

1. In the manufacture of sodium hyposulphite, the improvement which comprises preparing a sodium hyposulphite solution, evaporating the solution to an $Na_2S_2O_4$ content between 30% and 55% by weight, and salting out at a temperature between 55° and 65° C. the $Na_2S_2O_4$ in anhydrous form from the solution thus concentrated.

2. In the manufacture of sodium hyposulphite, the improvement which comprises preparing an aqueous sodium hyposulphite solution, subjecting the solution to vacuum evaporation to form an aqueous slurry of sodium hyposulphite having an $Na_2S_2O_4$ content between 30% and 55% by weight, heating the resultant slurry to a temperature between 55° and 65° C. and adding a sodium salt other than $Na_2S_2O_4$ thereto in sufficient quantity to form a substantially saturated solution of such salt, thereby expelling dissolved sodium hyposulphite from solution, and separating the resultant solid sodium hyposulphite in anhydrous form from mother liquor.

3. The method of making sodium hyposulphite, which comprises passing sulfur dioxide into an aqueous slurry of metallic zinc to form zinc hyposulphite, adding sodium carbonate to the resultant solution to precipitate zinc carbonate, separating the zinc carbonate from solution, adding lime to the solution to convert sodium bicarbonate formed by said sodium carbonate to sodium hydroxide, subjecting the resultant solution containing sodium hyposulphite and sodium hydroxide to vacuum evaporation to form an aqueous slurry of sodium hyposulphite containing between 30% and 55%, $Na_2S_2O_4$, and salting out the dissolved sodium hyposulphite in anhydrous form.

4. The method of recovering sodium hyposulphite from an aqueous solution thereof, which comprises subjecting the solution to evaporation at a solution temperature maintained below about 31° C. until the sodium hyposulphite content lies between 30% and 55% of the concentrate, heating the concentrate quickly to a temperature between 55° and 65° C., and then promptly, while the concentrate is at this temperature, adding sufficient sodium chloride to form a substantially saturated salt solution and expel sodium hyposulphite from solution and separating the resultant crystals of anhydrous sodium hyposulphite from resultant mother liquor.

5. The method of making sodium hyposulphite, which comprises passing sulfur dioxide into an aqueous slurry of metallic zinc to form zinc hyposulphite, adding sodium carbonate to the resultant solution to precipitate zinc carbonate, separating the zinc carbonate from solution, adding lime to the solution to convert sodium bicarbonate formed by said sodium carbonate to sodium hydroxide, removing undissolved material, subjecting the solution to evaporation at a solution temperature maintained below about 31° C. to form an aqueous slurry of sodium hyposulphite dihydrate containing between 30% and 55% $Na_2S_2O_4$, heating the slurry quickly to a temperature between 55° and 65° C., and then promptly, while the slurry is at this temperature, gradually adding over a period of about 15 minutes sufficient sodium chloride to form a substantially saturated salt solution and expel sodium hyposulphite from solution and separating the resultant crystals of anhydrous sodium hyposulphite from resultant mother liquor.

6. The method of making sodium hyposulphite, which comprises passing surfur dioxide into an aqueous slurry of metallic zinc to form zinc hyposulphite, adding sodium carbonate to the resultant solution to precipitate zinc carbonate, separating the zinc carbonate from solution, adding lime to the solution to convert sodium bicarbonate formed by said sodium carbonate to sodium hydroxide, removing undissolved material, subjecting the solution to vacuum evaporation at a solution temperature maintained below about 31° C. to form an aqueous slurry of sodium hyposulphite dihydrate containing between 30% and 55% $Na_2S_2O_4$, heating the slurry quickly to a temperature between 55° and 65° C., and then promptly, while the concentrate is at this temperature, gradually adding over a period of about 15 minutes sufficient sodium chloride to form a substantially saturated salt solution and expel from solution sodium hyposulphite in the form of coarse anhydrous crystals, and centrifugally separating the crystals of anhydrous sodium hyposulphite from resultant mother liquor.

7. In the manufacture of sodium hyposulphite, the improvement which comprises preparing an aqueous sodium hyposulphite solution, evaporating the solution to form an aqueous slurry of sodium hyposulphite dihydrate having an $Na_2S_2O_4$ content of about 50% by weight, and salting out the $Na_2S_2O_4$ in anhydrous form from the aqueous slurry at a temperature between 55° and 65° C.

8. In the manufacture of sodium hyposulphite, the improvement which comprises preparing an aqueous sodium hyposulphite solution, evaporating the solution to form an aqueous slurry of sodium hyposulphite dihydrate having an $Na_2S_2O_4$ content of about 50% by weight, heating the resultant slurry to a temperature between 55° and 65° C., adding a sodium salt other than $Na_2S_2O_4$ thereto to expel dissolved sodium hyposulphite from solution, and separating the resultant solid sodium hyposulphite in anhydrous form from mother liquor.

9. The method of making sodium hyposulphite, which comprises passing sulfur dioxide into an aqueous slurry of metallic zinc to form zinc hyposulphite, adding sodium carbonate to the resultant solution to precipitate zinc carbonate, separating the zinc carbonate from solution, adding lime to the solution to convert sodium bicarbonate formed by said sodium carbonate to sodium hydroxide, removing undissolved material, subjecting the solution to vacuum evaporation at a solution temperature maintained below about 31° C. to form an aqueous slurry of sodium hyposulphite dihydrate having an $Na_2S_2O_4$ content of about 50% by weight, heating the slurry quickly to a temperature between 55° and 65° C., and then promptly, while the slurry is at this temperature, gradually adding over a period of about 15 minutes sufficient sodium chloride to form a substantially saturated salt solution and expel sodium hyposulphite from solution and separating the resultant crystals of anhydrous sodium hyposulphite from resultant mother liquor.

RALPH S. PARK.
GEORGE S. SIMPSON.